May 27, 1958     J. P. MILLIRON     2,836,000
FISH CATCHING DEVICE
Filed Dec. 18, 1956
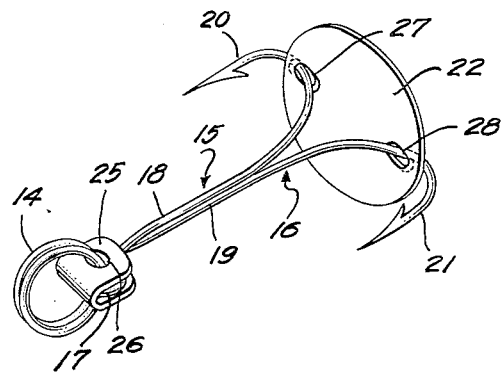
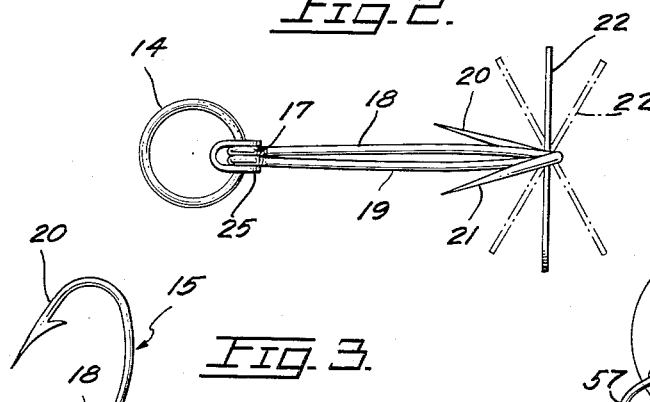
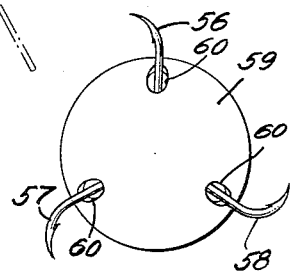
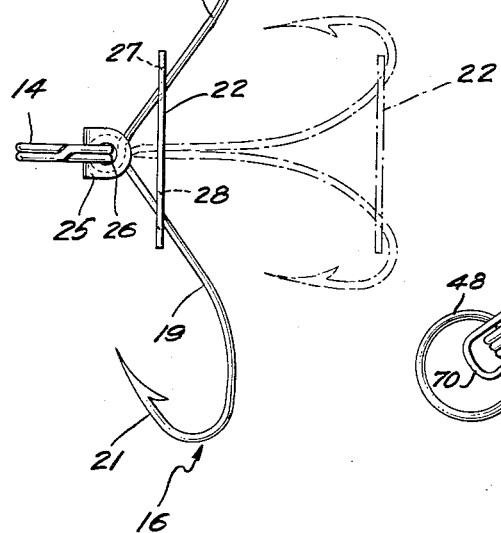
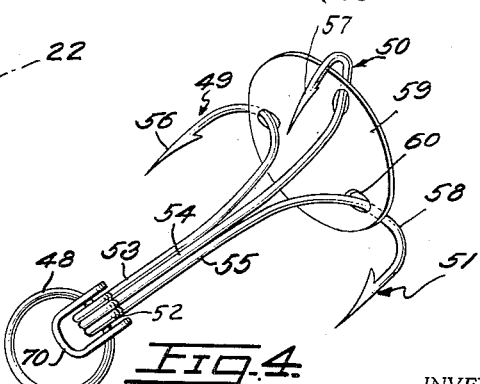
INVENTOR
JAMES P. MILLIRON
BY *Richard L. Underwood*
ATTORNEY

United States Patent Office 2,836,000
Patented May 27, 1958

2,836,000
FISH CATCHING DEVICE
James P. Milliron, Vandergrift, Pa.

Application December 18, 1956, Serial No. 629,136

3 Claims. (Cl. 43—36)

My invention relates to a fish catching device which is designed to cause increased setting of the hook when the fish attempts to discharge the hook by forcing water out of its mouth.

One of the problems faced by fishermen is the proper setting of a hook in a fish's mouth and the maintenance of this hook setting as the fish fights and attempts to eject the hook from its mouth.

When a fish takes a bait or food into its mouth it tends to draw the food in by sucking in water. The water is then discharged through its gills. When a bait is taken and a hook is partially set, the fish will attempt to discharge the hook by forcing water from its mouth. My invention utilizes these natural physical reactions of a fish to aid the fisherman in estbalishing a strong set of the hook in the fish's mouth.

My invention provides a plurality of hooks which are pivotally mounted on a base and carry a flutter control plate which holds the plurality of hooks to a minimum outer transverse circumference while the bait is in the water. As the fish draws the bait into its mouth the flutter control plate will maintain the hooks at a minimum outer circumference, but when the hooks have been partially set in the fish's mouth and the fish attempts to throw off the hooks by discharging water, the flutter control plate will move back on the shanks of the hooks and cause the outer circumference of the hooks to increase, thereby causing increased setting of the hooks in the fish's mouth. The flutter control plate also provides a movement while in the water which will attract fish and which therefore can substitute for bait or lures under certain environments.

Various other objects and meritorious features of my invention will be apparent from the following description taken in conjunction with the drawings wherein like numerals refer to like parts throughout the figures and wherein:

Fig. 1 is a perspective view of my invention showing a two-hook modification;

Fig. 2 is a side view of Fig. 1 showing my fish catching device in normal fishing condition with the flutter action of the plate being shown in dotted lines;

Fig. 3 is a top view of Fig. 2 showing in dotted lines the normal position of the hooks as in Fig. 2 and in solid lines the position of the hooks when they are in fully set position;

Fig. 4 is a perspective view of a modification of my invention employing three fish hooks; and Fig. 5 is an outer end view of Fig. 4.

Referring now to Fig. 1, it will be seen that the fish catching device of my invention includes a base 14 which is preferably a double ring of wire suitable for attachment to lines and lures in a fashion well known in the art. A plurality of fish hooks 15 and 16 have base ends 17 which are pivotally mounted on the base 14, these base ends 17 being eyelets formed by bending the base end of the fish hook. Preferably there is a considerable amount of play in this pivotal mounting to provide somewhat free and uninhibited movement of the fish hooks.

The fish hooks 15 and 16 are mounted in side-by-side relation on the base 14 and, in the preferred embodiment shown in Figs. 1–3, a holder 25 is provided, this being in the form of a U-shaped clip with holes 26 for receiving the base 14. The holder 25 contacts the outer end surfaces of the eyelets 17 and holds them in clustered condition.

The fish hooks 15 and 16 have elongated shanks 18 and 19 and outer U-shaped hook portions 20 and 21, respectively.

Under normal conditions the shanks extend longitudinally forward in side-by-side relation, forming a central core or cluster from which the U-shaped hook portions extend transversely outwardly and then rearwardly at a predetermined transverse angular relationship to each other.

A flutter control plate 22 is provided which has bearing holes 27 and 28 for each of the fish hooks 15 and 16, respectively, this plate being transversely mounted on the hooks for longitudinal sliding movement from the normal forward position shown in Figs. 1 and 2 to the set rearward position shown in full lines in Fig. 3. The bearing holes 27 and 28 in the flutter plate are disposed in a predetermined fashion to provide an angular relationship conforming to the angular relationship of the U-shaped hook portions 20 and 21.

In the modification shown in Figs. 1–3 the U-shaped hook portions 20 and 21 extend transversely outwardly at a transverse angular relationship of 180° between each other, and in conformity therewith the bearing holes 27 and 28 of the flutter control plate 22 are positioned 180° apart.

As seen in Fig. 1, the flutter control plate 22 when in normal forward position is positioned on the U-shaped hook portions 20 and 21, and when in set rearward position the flutter control plate is positioned on the rearward portions of the shanks 18 and 19.

The bearing holes 27 and 28 as seen in Fig. 1 are preferably elliptical in shape and have outwardly and forwardly slanted side walls to provide a surface-to-surface bearing action on the fish hooks and thereby avoid any destructive sharp-edge frictional engagement with the hooks. The bearing holes are also larger than the cross section of the hooks to provide a free sliding action for the flutter control plate 22.

Another modification of my invention is shown in Figs. 4 and 5 wherein three fish hooks 49, 50 and 51 are pivotally mounted on a base or ring 48 by means of base ends 52 in a manner similar to that shown in Figs. 1–3. The fish hooks 49, 50 and 51 have elongated shanks 53, 54 and 55 and U-shaped hook portions 56, 57 and 58, respectively. A flutter control plate 59 is provided, this plate having bearing holes 60 which are angularly spaced at 120° to conform with the transverse angular relationship of the U-shaped hook portions 56, 57 and 58. It will be noted that the three base ends 52 of the hooks 49, 50 and 51 are aligned in side-by-side relationship on the base holder 70, the angular relationship of the U-shaped hook portions being provided by twisting the standard hooks or by specially forming the eyelets at the base ends 52 of the hooks. The operation of the modification in Figs. 4 and 5 is similar to that described with regard to Figs. 1–3.

Various modifications of this invention will be apparent to those skilled in the art and for that reason I wish to limit myself only within the scope of the appended claims.

I claim:

1. A fish catching device comprising a base adapted to be fixedly attached to a fishing line to provide complete and direct control thereof through the fishing line, a plurality of fish hooks having base ends pivotally mounted on said base in side-by-side relation, each of said fish hook having an elongated shank extending from its base end and an outer U-shaped hook portion, the shanks under normal conditions extending longitudinally forward in side-by-side relation, the U-shaped hook portions under normal conditions extending transversely outwardly and then rearwardly from the central core formed by the shanks at predetermined transverse angular relationship to each other, a flutter control plate having bearing holes for each of said fish hooks and transversely mounted on said hooks for free longitudinal sliding movement from a normal forward position on said U-shaped hook portions to a set rearward position on said shanks, said flutter control plate contacting only said fish hooks, the bearing holes of said flutter control plate having a transverse angular relationship conforming to said transverse angular relationship of said U-shaped hook portions whereby under normal conditions the shanks are held side by side and, on movement of the flutter control plate to said set rearward position by force on said plate created by a fish, the shanks are pivoted outwardly.

2. A fish catching device in accordance with claim 1 and wherein two fish hooks are pivotally mounted on said base, the U-shaped hook portions of said hooks extending transversely outwardly at a transverse angular relationship of 180° between each other.

3. A fish catching device in accordance with claim 1 and wherein three fish hooks are pivotally mounted on said base, the U-shaped hook portions of said hooks extending transversely outwardly at a transverse angular relationship of 120° between each other.

References Cited in the file of this patent
UNITED STATES PATENTS 387,015    Smith _____ July 31, 1888

FOREIGN PATENTS 236,188    France _____ June 16, 1945